(12) United States Patent
Ziegler et al.

(10) Patent No.: US 7,880,332 B2
(45) Date of Patent: Feb. 1, 2011

(54) AUTOMATIC BATTERY RECONNECTION

(75) Inventors: William E. Ziegler, Reading, MA (US); Ashok B. Kulkarni, Andover, MA (US)

(73) Assignee: American Power Conversion Corporation, West Kingston, RI (US)

( * ) Notice: Subject to any disclaimer, the term of this patent is extended or adjusted under 35 U.S.C. 154(b) by 208 days.

(21) Appl. No.: 12/025,666

(22) Filed: Feb. 4, 2008

(65) Prior Publication Data
US 2009/0195075 A1    Aug. 6, 2009

(51) Int. Cl.
    H02J 9/00    (2006.01)
(52) U.S. Cl. .......................... 307/64; 307/66
(58) Field of Classification Search .................. 307/64, 307/66
    See application file for complete search history.

(56) References Cited

U.S. PATENT DOCUMENTS

| | | | | |
|---|---|---|---|---|
| 5,081,367 A * | 1/1992 | Smith et al. | ................... | 307/64 |
| 5,432,386 A | 7/1995 | Cerra, Jr. et al. | | |
| 5,781,448 A | 7/1998 | Nakamura et al. | | |
| 6,175,311 B1 * | 1/2001 | Li | ............................... | 340/657 |
| 6,271,605 B1 * | 8/2001 | Carkner et al. | .............. | 307/125 |
| 2002/0122322 A1 | 9/2002 | Oughon, Jr. | | |
| 2004/0189253 A1 | 9/2004 | Tanabe et al. | | |
| 2005/0206241 A1 * | 9/2005 | Saxena et al. | ................. | 307/66 |
| 2005/0225919 A1 | 10/2005 | Combier | | |
| 2008/0197706 A1 * | 8/2008 | Nielsen | ....................... | 307/66 |

FOREIGN PATENT DOCUMENTS

| | | |
|---|---|---|
| EP | 0468769 A2 | 1/1992 |
| WO | WO02/060031 A2 | 8/2002 |

* cited by examiner

*Primary Examiner*—Robert L. DeBeradinis
(74) *Attorney, Agent, or Firm*—Townsend and Townsend and Crew LLP

(57) ABSTRACT

An uninterruptible power supply system includes power converter circuitry configured to convert AC input power to a first DC power and a second DC power to the first DC power, a battery pack configured to provide the second DC power, a power relay mechanism coupled to the power converter circuitry and to the battery pack that selectively moves between an open position and a closed position, the power relay mechanism coupling the battery pack to the power converter circuitry when in the closed position and isolating the battery pack from the power converter circuitry when in the open position, and control circuitry configured to provide a control signal, where the power relay mechanism includes a motor actuator coupled to the control circuitry, the motor actuator being responsive to the control signal to change the power relay mechanism from the open position to the closed position.

21 Claims, 5 Drawing Sheets

AUTOMATIC BATTERY RECONNECTION

BACKGROUND

Uninterruptible power supply (UPS) systems typically have backup power supplied by batteries. For example, referring to FIG. 1, a UPS system 10 includes power circuitry 12, a power relay mechanism 14, and a battery pack 16. The battery pack 16 includes multiple batteries connected in series to supply DC voltage to the power circuitry 12. The mechanism 14 connects the circuitry 12 to the battery pack 16 to supply power from the battery pack 16 to the circuitry 12, to supply from the circuitry 12 to the battery pack 16, and can disconnect the circuitry 12 from the battery pack 16 to inhibit energy transfer between the circuitry 12 and the battery pack 16.

The mechanism 14 acts as a breaker or switch to act as a disconnecting means, e.g., as required by safety codes because a source of power (here, the battery pack 16) must be disconnected from the power circuitry 12 during an emergency, or for non-code purposes such as maintenance of the UPS system 10. The mechanism 14 can comprise a circuit breaker (with or without a fuse) or a switch 20 (as shown) with a fuse (not shown) to provide desired protection. The term "switch" is used below, but this term refers to a switch or a breaker, as appropriate. The mechanism 14 can disconnect the battery pack 16 from the circuitry 12, e.g., at the end of a discharge cycle when AC power is not available to the power circuitry 12, to help prevent deep discharge of the batteries in the battery pack 16 to thereby help prevent damage to the batteries.

To disconnect the power circuitry 12 from the battery pack 16, the mechanism 14 includes an under-voltage relay (UVR) coil and/or a shunt trip (ST) coil 18. The ST/UVR 18 is controlled by a control voltage $V_C$. The control voltage causes the UVR/ST 18 to actuate the breaker/switch 20 to disconnect the circuitry 12 from the battery pack 16. An ST is typically used to disconnect the circuitry 12 from the battery pack 16 in times of emergency (providing emergency power off (EPO) functionality). The UVR can also open the breaker/switch 20 in response to the voltage provided by the battery pack 16 dropping below a threshold voltage.

The mechanism 14 is configured such that when the switch 20 is opened, the switch 20 must be closed manually to reconnect the battery pack 16 to the power circuitry 12. Manually closing multiple battery switches after a loss of power is prone to human error. An operator must first locate which mechanisms 14 need to be reset, and then properly reset the mechanisms 14. This process is tedious and prone to error. A switch that is not properly reset can substantially reduce the run time of the UPS system 10 and result in damage, e.g., due to deep discharge of battery packs 16.

BRIEF SUMMARY OF THE INVENTION

In general, in an aspect, the invention provides an uninterruptible power supply (UPS) system including an input configured to receive AC input power, power converter circuitry coupled to the input and configured to convert the AC input power to a first DC power, and to convert a second DC power to the first DC power, an output coupled to the power converter circuitry and configured to be coupled to a load, a battery pack including at least one battery, the battery pack being configured to provide the second DC power, a power relay mechanism coupled to the power converter circuitry and to the battery pack that selectively moves between an open position and a closed position, the power relay mechanism coupling the battery pack to the power converter circuitry when in the closed position and isolating the battery pack from the power converter circuitry when in the open position, and control circuitry configured to provide a control signal, where the power relay mechanism includes a motor actuator coupled to the control circuitry, the motor actuator being responsive to the control signal to change the power relay mechanism from the open position to the closed position.

Implementations of the invention may include one or more of the following features. The control circuitry is configured to provide the control signal automatically to the power relay mechanism in response to determining that the AC input power at the input changes from being unacceptable for use in providing the first DC power to being acceptable for use in providing the first DC power. The control circuitry is configured to provide the control signal automatically to the power relay mechanism in response to determining both that the AC input power at the input changes from being unacceptable for use in providing the first DC power to being acceptable for use in providing the first DC power and that at least one further criterion is satisfied. The at least one further criterion being satisfied is an indication that the power relay mechanism is in the open position. The at least one further criterion being satisfied is an expiration of a timer. The power relay mechanism further includes at least one of an under voltage relay and a shunt trip configured to change the power relay mechanism from the closed position to the open position. The motor actuator is further configured to change the power relay mechanism from the closed position to the open position. The power relay mechanism further includes at least one of an under voltage relay and a shunt trip configured to change the power relay mechanism from the closed position to the open position independently of the motor actuator.

In general, in another aspect, the invention provides an uninterruptible power supply (UPS) system including a UPS input configured to receive AC input power, a UPS output configured to be coupled to a load, a cabinet, a battery pack disposed in the cabinet and including a plurality of batteries coupled together, the battery pack providing battery pack DC power, a power relay mechanism having a relay mechanism input coupled to the battery pack and that selectively moves between an open position and a closed position, the power relay mechanism coupling the relay mechanism input to a relay mechanism output when in the closed position and isolating the relay mechanism input from the relay mechanism output when in the open position, and power converter circuitry coupled to the UPS input, the UPS output, and the relay mechanism output, the power converter circuitry configured to convert the AC input power to an output AC power, to convert the battery pack DC power to the output AC power, and to provide the output AC power to the UPS output, where the power relay mechanism includes a motor actuator coupled to the control circuitry, the motor actuator being configured to automatically change the power relay mechanism from the open position to the closed position in response to at least one criterion including that the AC input power at the UPS input changing from being unacceptable for use in providing the output AC power to being acceptable for use in providing the output AC power.

Implementations of the invention may include one or more of the following features. The at least one criterion further includes the power relay mechanism being in the open position. The at least one criterion further includes a DC power at the power relay mechanism having a voltage at least as high as a threshold value.

In general, in another aspect, the invention provides a battery pack system including a standard-sized information technology equipment rack, a power output, batteries coupled together to provide a battery-pack DC power, the batteries being disposed in the equipment rack, and a power relay mechanism coupled to the power output and to the battery pack, the power relay mechanism selectively coupling the battery pack to the power output and selectively isolating the battery pack from the power output, the power relay mechanism including a motor actuator to automatically change the power relay mechanism from coupling the plurality of batteries to the power output to isolating the plurality of batteries from the power output in response to a control signal indicative of criteria including that a main power associated with the battery pack system unavailable and a voltage from the plurality of batteries is below a desired level.

Implementations of the invention may include one or more of the following features. The criteria further include the expiration of a timer.

In general, in another aspect, the invention provides a method for providing automated reconnection of a battery pack to power circuitry, the method including monitoring at least one criterion for selectively coupling a power output circuit and a battery pack, the at least one criterion including an acceptability of a main power source, sending, based on the at least one criterion, a control signal to a motor actuator in a power relay mechanism to couple the power output circuit and the battery pack, and in response to the control signal, connecting the battery pack to the power circuitry.

Implementations of the invention may include one or more of the following features. The monitoring includes monitoring safety conditions associated with the power output circuit. The monitoring includes monitoring a timer.

In general, in another aspect, the invention provides a computer program product residing on a computer-readable medium and including computer-readable instructions to cause a computer to: monitor at least one criterion for selectively coupling a power output circuit and a battery pack, the at least one criterion including the acceptability of a main power source, and send, based on the at least one monitored criterion, a control signal to a motor actuator in a power relay mechanism to couple the power output circuit and the battery pack.

Implementations of the invention may include one or more of the following features. The instructions to cause the computer to monitor cause the computer to monitor safety conditions associated with the power output circuit. The instructions to cause the computer to monitor cause the computer to monitor a timer.

In general, in another aspect, the invention provides a power relay mechanism to selectively couple a power output circuit and a battery pack, the power relay mechanism including a switching circuit configured to selectively couple a battery pack to a power output circuit and to selectively isolate the battery pack from the power output, and a motor actuator coupled to the switching circuit and configured to automatically actuate the switching circuit to couple the battery pack to the power output circuit in response to at least one criterion including that a main power associated with the power output circuit changes from being unavailable to being available.

Implementations of the invention may include one or more of the following features. The power relay mechanism further includes a control circuit coupled to the motor actuator and configured to provide a control signal to the motor actuator indicative of the at least one criterion. The control circuit is further configured to monitor the main power. The control circuit is further configured to monitor a safety condition associated with the power output circuit and to provide the control signal based in part on a status of the monitored safety condition. The control circuit is further configured to monitor a timer and to provide the control signal based in part on a status of the monitored timer.

Embodiments of the invention may provide one or more of the following capabilities. Battery damage in UPS systems due to deep discharge can be reduced. Run time of UPS systems following a power outage can be improved. A battery pack of a UPS system can be disconnected from a UPS system's power circuitry before full discharge of the battery pack during power outage. Disconnected battery packs of UPS systems can be automatically reconnected to power circuitry of the UPS systems after a power outage in response to power being restored to the UPS systems. Errors in reconnecting battery packs after a power failure can be reduced. Battery packs can be reconnected at correct times after a UPS DC bus has been charged to a suitable level subsequent to power restoration. Damage to UPS systems (e.g., Delta Conversion of UPS) can be inhibited or prevented.

DETAILED DESCRIPTION OF THE INVENTION

Embodiments of the invention provide techniques for reconnecting batteries to power circuitry in UPS systems. A motor actuator is provided in a power relay mechanism of a UPS system that can close a circuit breaker or switch (hereafter "switch") without human involvement. The motor actuator can respond to power being available to a UPS system to close a switch that has been opened in response to a loss of supply power, a reduction in supply power, a voltage from a battery pack below a threshold, or other reason. Intelligence within the UPS system controls the motor actuator to close the switches as appropriate. Other embodiments are within the scope of the invention.

Figure 1:
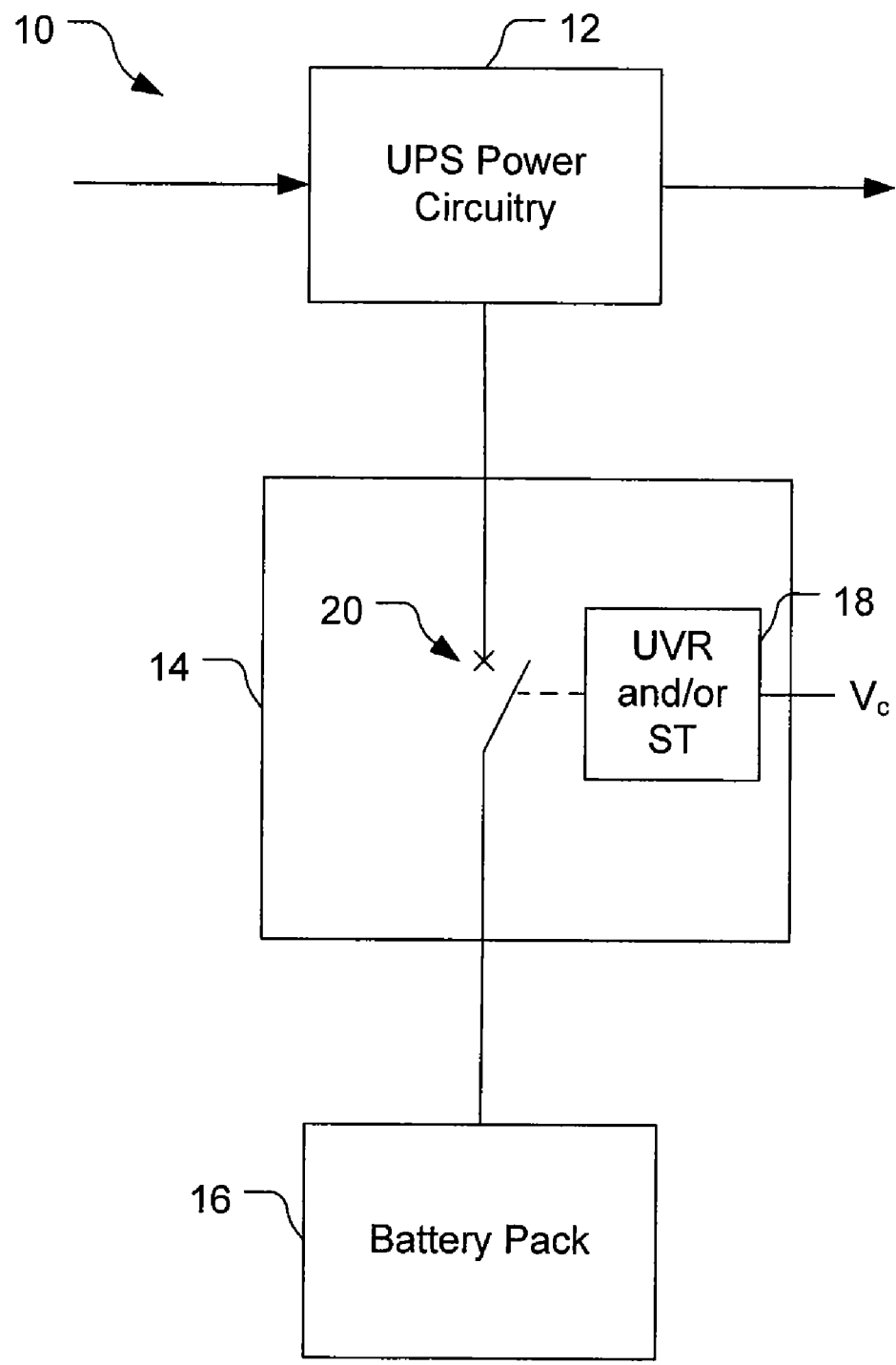
FIG. 1 is a block diagram of a prior art UPS system.
Figure 2:
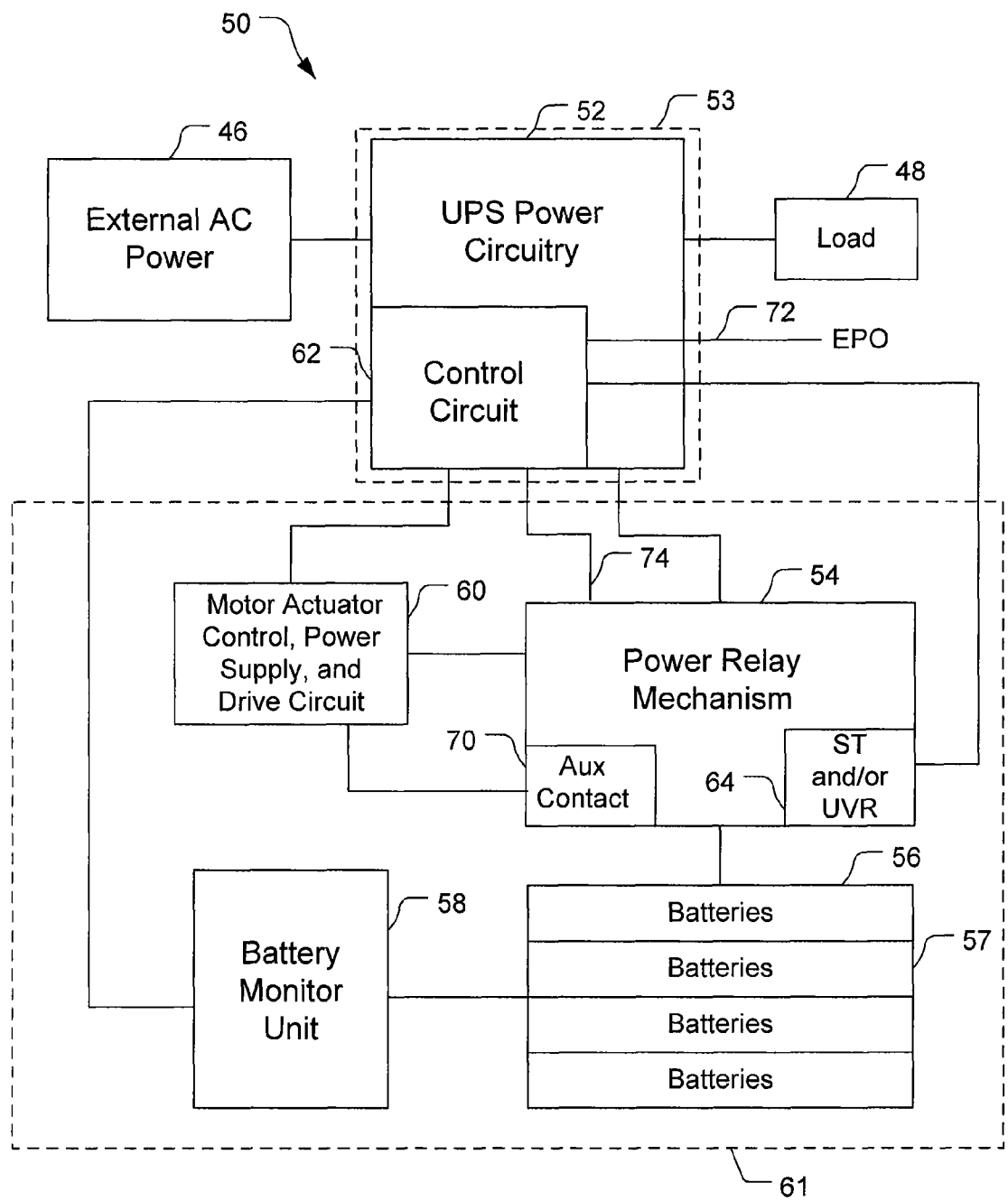
FIG. 2 is a block diagram of an embodiment of a UPS system according to the invention.
Figure 5:
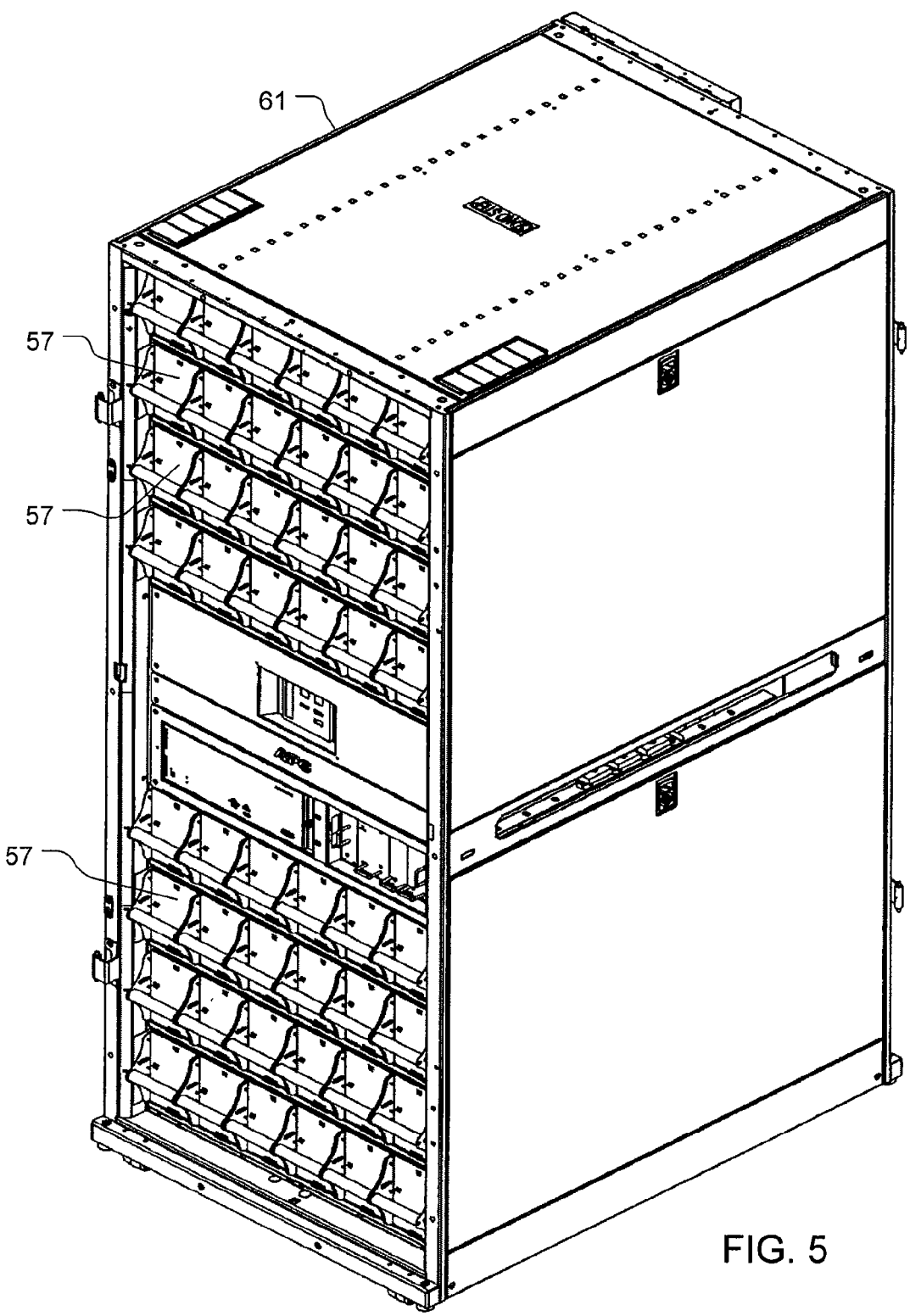
FIG. 5 is a perspective view of batteries in an equipment rack, shown schematically in FIG. 2.

Referring to FIG. 2, a UPS system 50 for use with an external AC power supply 46 and a load 48 includes UPS power circuitry 52, a power relay mechanism 54, a battery pack 56, a battery monitor unit 58, and a motor unit 60. The motor unit 60 includes a motor actuator control, a power supply, and a drive circuit. Batteries 57 in the battery pack 56 may or may not be modular batteries. The power circuitry 52 is configured to selectively convert and supply power from the external AC power source 46 or the batter pack 56 to the load 48 with desired voltage characteristics (e.g., voltage) as directed by a control circuit 62 of the power circuitry 52. The battery monitor unit 58 is configured to monitor voltage and temperature of the batteries 57 in the battery pack 56 and provide this information to the control circuit 62 via a controller area network (CAN) bus. The monitor unit 58 can also help adjust the float charge voltage depending on the temperature. The circuitry 52, as shown in this example, is disposed in a housing 53 and the mechanism 54, the battery pack 56, the battery monitor unit 58, and as also shown in FIG. 5 the motor unit 60 are disposed in a standard-sized information technology rack/cabinet 61 (e.g., 600 mm or 750 mm in width, 1080 mm in depth, and 2000 mm in height), although other configurations and physical layouts may be used.

The control circuit 62 is configured to provide one or more signals for use in controlling the power relay mechanism 54. The control circuit 62 can determine when the power source 46 is operational and providing adequate power to the UPS 52 to power the load without using power from the battery pack 56, can determine whether the power source 46 is down or otherwise unacceptable for powering the load and the power circuitry 52 is being powered from the battery pack 56, and can determine when power returns to being supplied from the AC power source 46 instead of from the battery pack 56. The control circuit 62 provides a signal to the motor unit 60 indicating that power from the AC power source 46 has changed from being unacceptable to power the load 48 to being acceptable to power the load 48. The control circuit 62 can also provide a signal to the motor unit 60 to cause the relay mechanism 54 to disconnect the battery pack 56 and the power circuitry 52, e.g., in response to determining that the power from the source 46 is unacceptable for charging the batteries 57, in response to determining that an emergency exists such that battery power should not be provided, etc. The control circuit 62 can also send signals to the relay mechanism 54 on a line 74 indicating an emergency, an undervoltage condition (e.g., the voltage supplied by the batteries 57 is below a desired level), etc. in order to cause a disconnection of the battery pack 56 and the power circuitry 52. The control circuit 62 can send the disconnect signal for various reasons, e.g., to help avoid deep discharge of the batteries 57.

The motor unit 60 is configured to monitor relevant conditions of the UPS system 50 and signals from the control circuit 62, and to supply open-switch and close-switch signals to control the power relay mechanism 54. The motor unit 60 monitors the state of the power relay mechanism 54 via a signal received from an auxiliary contact 70 of the power relay mechanism 54. The motor unit 60 further monitors the state of the external AC power source 56 via the signal from the control circuit 62. The motor unit 60 is configured to respond to the power returning to being supplied from the power source 46 instead of from the battery pack 56, the output power having a voltage higher than a threshold value for safe operation of the power relay mechanism 54, and the auxiliary contact 70 indicating that the switch 66 is open, to automatically (without human involvement) send the close-switch signal to actuate the relay mechanism to connect the power circuitry 52 and the battery pack 56. Thus, the motor unit 60 may automatically cause the relay mechanism to connect the power circuitry 52 and the battery pack 56 in response to a single indication from the control circuit 62 that the AC power source 46 is again properly running. The motor unit 60 can also respond to the indication from the control circuit 62 to disconnect the battery pack 56 from the power circuitry 52 to send the open-switch signal to the relay mechanism 54.

Figure 3:
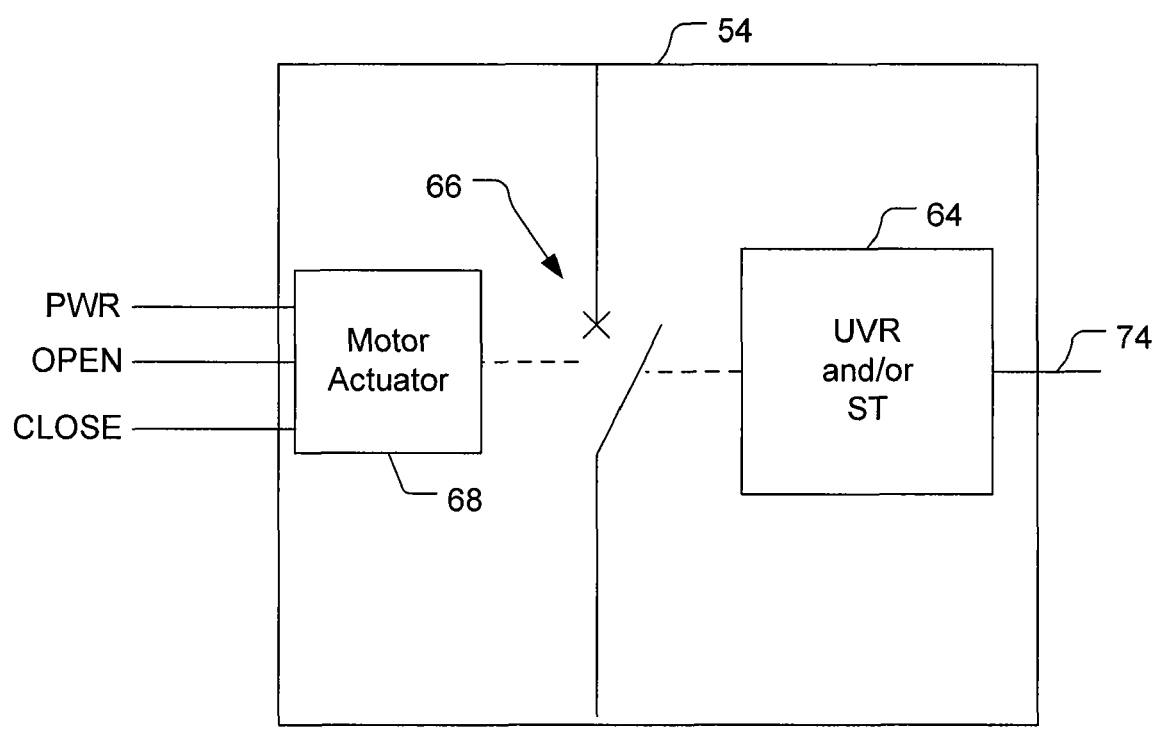
FIG. 3 is a schematic of a portion of a power relay mechanism shown in FIG. 2.

The relay mechanism is configured to respond to the signals from the motor unit 60 to disconnect the battery pack 56 from, and reconnect the battery pack 56 to, the power circuitry 52. Referring also to FIG. 3, the power relay mechanism 54 includes a disconnect mechanism 64 (a UVR and/or an ST), a switch 66, and a motor actuator 68. The switch 66 is coupled and configured to selectively relay energy between the battery pack 56 and the power circuitry 52 as regulated by the disconnect mechanism 64 and the motor actuator 68. The disconnect mechanism 64 is configured to open the switch 66 to disconnect the power circuitry 52 from the battery pack 56 in response to a control signal received on a line 74 from the control circuit 62. The motor actuator 68 can receive control power (PWR), the open-switch signal (OPEN), and the close-switch signal (CLOSE) from the motor unit 60. The motor actuator 68 is configured to respond to the close-switch signal to move the switch 66 to its closed position and to respond to the open-switch signal to move the switch 66 to its open position as shown in FIG. 3.

Figure 4:
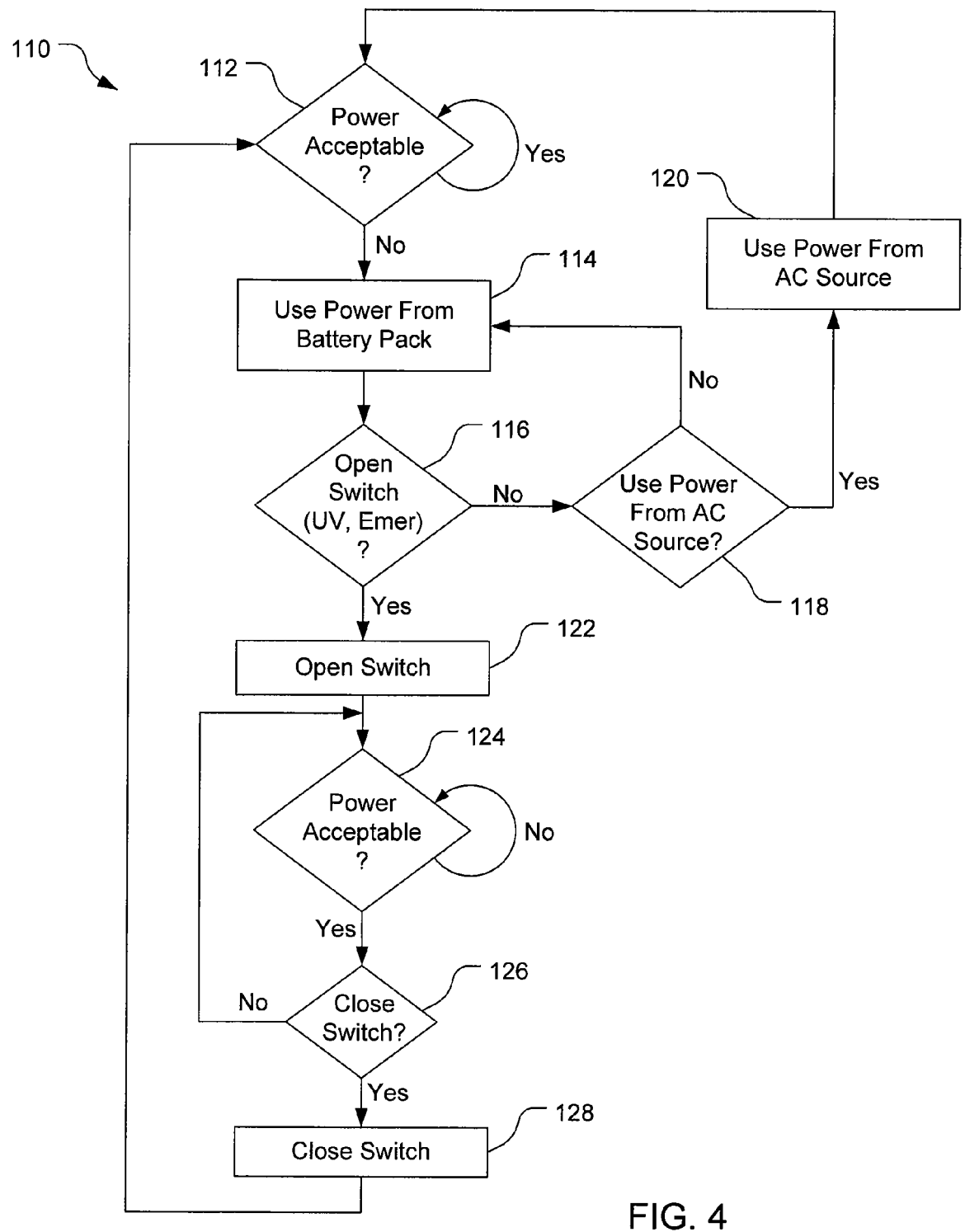
FIG. 4 is a block flow diagram of a process of reconnecting a battery pack to power circuitry shown in FIG. 2.

In operation, referring to FIG. 4, with further reference to FIGS. 2-3, a process 110 for disconnecting and automatically reconnecting the battery pack 56 to the power circuitry 52 includes the stages shown. The process 110, however, is exemplary only and not limiting. The process 110 may be altered, e.g., by having stages added, removed, or rearranged.

At stage 112, an inquiry is made as to whether the AC power source 46 is operational and providing acceptable power to the power circuitry 52. The control circuit 62 monitors the power provided by the power source 46. If the power provided from the source 46 is acceptable, then the process 110 remains at stage 112 with the control circuit 62 monitoring the power from the source 46. If the power is unacceptable, then the process proceeds to stage 114.

At stage 114, the control circuit 62 changes the power source for the load 48. If the power provided by the source 46 drops below a desired level, or is deficient in some other manner, the control circuit 62 determines that the power is unacceptable, and causes power to be provided from the battery pack 56 through the power circuitry 52 to the load 48.

At stage 116, an inquiry is made as to whether to disconnect the battery pack 56 from the power circuitry 52. The control circuit 62 determines whether the switch 66 should be opened. The circuit 62 monitors the battery voltage as indicated by the battery monitor unit 58 and monitors the EPO signal on the line 72 for emergencies. The control circuit 62 can also monitor for other reasons for opening the switch 66. If the control circuit 62 does not determine that the switch 66 should be open, then the process 110 proceeds to stage 118. If the control circuit 62 determines that the switch 66 should be opened (e.g., due to undervoltage, emergency, etc.), then the process 110 proceeds to stage 122.

At stage 118, an inquiry is made as to whether the AC power source 46 is operational and providing acceptable power to the power circuitry 52. If acceptable power is now being provided, then the process 110 proceeds to stage 120 where the control circuitry 52 causes power from the source 46 to be used, converted, and provided to the load 48. If unacceptable power is available from the source 46, then the process 110 returns to stage 114.

At stage 122, the switch 66 is opened. For example, the control circuit 62 responds to an emergency indicated on the line 72 by sending a control voltage signal to the disconnect mechanism 64. The disconnect mechanism 64 responds to the control signal from the control circuit 62 to open the switch 66, thereby disconnecting the power circuitry 52 from the battery pack 56. Alternatively, the control circuit 62 sends one or more signals to the motor unit 60 to actuate the motor actuator 68 to open the switch 66 (e.g., in response to determining an undervoltage condition).

At stage 124, an inquiry is made as to whether the external AC power source 46 returns to operational status, providing acceptable power for powering the load 48. The control circuit 62 monitors whether the power received from the AC power source 46 returns to acceptability. If the circuit 62 determines that the power from the AC power source 46 has not returned to acceptable status, then the process 110 remains at stage 124. If the control circuit 62 determines that the power received from the external AC power source 46 is acceptable (e.g., the power source 46 is again operational and producing enough power to power the load 48 as desired), then the process 110 proceeds to stage 126.

At stage 126, an inquiry is made as to whether the switch 66 should be closed. The control circuit 62 determines whether the switch 66 should be closed based on one or more criteria. For example, the circuit 62 monitors a timer, monitors safety conditions such as whether a door to a cabinet housing the battery pack 56 is open, whether an emergency is indicated on the EPO line 72, etc. If the control circuit 62 determines that the switch 66 should not be closed, then the control circuit 62 does not send a close-switch signal to the motor unit 60, and the process 110 returns to stage 124. If the control circuit 62 determines that the switch 66 should be closed, then the process 110 proceeds to stage 128.

At stage 128, the switch 66 is closed automatically. The control circuit 62 sends a control signal to the motor unit 60 indicating that the power from the source 46 has returned to being acceptable. The motor unit 60 responds to knowledge that the switch 66 is open as indicated by a signal from the auxiliary contact 70, and the control signal from the control circuit 62, to send a close-switch signal to the motor actuator 68. The motor actuator 68 responds to the close-switch signal to move the switch 66 from its open position to its closed position. The process 110 returns to stage 112.

Other embodiments are within the scope of the invention. For example, while the discussion above describes the decision as to whether the switch 66 should be closed being performed in the control circuit 62, this decision can be performed elsewhere in the system 50, such as in the motor unit 60, in the battery monitor unit 58, or elsewhere. Further, the process 110 can be modified from the depiction in FIG. 4 and the description above. For example, stage 126 can be eliminated. Thus, the process can proceed directly from stage 124 to stage 128 where the motor unit 60 would respond to an indication of the AC power source 46 being operational to automatically cause the switch 66 to close without waiting for a command signal from the control circuit 62. Also, the decision on whether to close the switch 66 can be made at various places in the system 50, such as in the control circuit 62 or in the battery monitor unit 58. Further, the control circuit 62 may send a signal indicating to the motor unit 60 to cause the relay mechanism to connect the battery pack 56 to the power circuitry 52, with this signal not necessarily indicating that the power from the source 46 has returned to being acceptable to power the load 48 from being unacceptable to power the load.

Further, the control circuit 62 may analyze information in addition to information that the power from the AC power source 46 has changed from being unacceptable to power the load 48 to being acceptable to power the load 48 in order to determine to whether indicate to the motor unit 60 to close the switch 66. The control circuit 62 may, e.g., start a timer when the power returns to being acceptable to power the load 48 and then send an indication to the motor unit 60 to close the switch 66 in response to the timer expiring. Further still, a DC voltage on a bus connecting the UPS power circuitry to the power relay mechanism can be monitored, and the switch 20 prevented from being closed unless this voltage is at or above a threshold voltage, e.g., in Delta Conversion systems. Still other criteria may also be examined. The control circuit 62 may send a single signal to the motor unit 60 after analyzing multiple criteria, or may send multiple signals that each may indicate a determination based on one or more criteria and the motor unit 60 can analyze these signals to determine whether and when to send the switch-close signal to the motor actuator 68. Multiple indications may be combined into a single signal from the control circuit 62. Similar techniques may be employed to determine whether and when to send the switch-open signal to the motor actuator 68. In order to accommodate these embodiments of the control circuit 62, the motor unit 60 may be configured to wait for an indication from the control circuit 62 to actuate the motor actuator 68 after the control circuit 62 has indicated that power has returned to being provided by the AC power source 46. Thus, the motor unit 60 may cause the switch 66 to close in response to an indication from the control circuit 62 that the AC power source 46 is again properly running and one or more other indications from the control circuit 62 indicative of one or more other criteria.

What is claimed is:

1. An uninterruptible power supply (UPS) system comprising:
   an input configured to receive AC input power;
   power converter circuitry coupled to the input and configured to convert the AC input power to a first DC power, and to convert a second DC power to the first DC power;
   an output coupled to the power converter circuitry and configured to be coupled to a load;
   a battery pack including at least one battery, the battery pack being configured to provide the second DC power;
   a power relay mechanism coupled between the power converter circuitry and the battery pack that selectively moves between an open position and a closed position, the power relay mechanism coupling the battery pack to the power converter circuitry when in the closed position and isolating the battery pack from the power converter circuitry when in the open position; and
   control circuitry communicatively coupled to the input and the power relay mechanism and configured to:
      provide a first control signal automatically to the power relay mechanism in response to determining that the AC input power at the input changes from being unacceptable for use in providing the first DC power to being acceptable for use in providing the first DC power; and
      monitor a safety condition associated with the UPS and provide a second control signal automatically to the power relay mechanism in response to detecting an unsafe state of the safety condition;
   wherein the power relay mechanism includes a motor actuator coupled to the control circuitry, the motor actuator being responsive to the first control signal to change the power relay mechanism from the open position to the closed position and being responsive to the second control signal to change the power relay mechanism from the closed position to the open position.

2. The UPS system of claim 1 wherein the control circuitry is configured to provide the first control signal automatically to the power relay mechanism in response to determining both that the AC input power at the input changes from being unacceptable for use in providing the first DC power to being acceptable for use in providing the first DC power and that at least one further criterion is satisfied.

3. The UPS system of claim 2 wherein the at least one further criterion being satisfied is an indication that the power relay mechanism is in the open position.

4. The UPS system of claim 2 wherein the at least one further criterion being satisfied is an expiration of a timer.

5. The UPS system of claim 1 wherein the power relay mechanism further includes at least one of an under voltage relay or a shunt trip configured to change the power relay mechanism from the closed position to the open position.

6. The UPS system of claim 1 wherein the power relay mechanism further includes at least one of an under voltage relay or a shunt trip configured to change the power relay mechanism from the closed position to the open position independently of the motor actuator.

7. An uninterruptible power supply (UPS) system comprising:
- a UPS input configured to receive AC input power;
- a UPS output configured to be coupled to a load;
- a cabinet;
- a battery pack disposed in the cabinet and including a plurality of batteries coupled together, the battery pack providing battery pack DC power;
- a power relay mechanism having a relay mechanism input coupled to the battery pack and that selectively moves between an open position and a closed position, the power relay mechanism coupling the relay mechanism input to a relay mechanism output when in the closed position and isolating the relay mechanism input from the relay mechanism output when in the open position;
- control circuitry communicatively coupled to the UPS input and the power relay mechanism and configured to:
  - provide a first control signal automatically to the power relay mechanism in response to determining that at least one criterion is satisfied, the at least one criterion including that the AC input power at the input changes from being unacceptable for use by the load to being acceptable for use by the load, and
  - monitor a safety condition associated with the UPS and provide a second control signal automatically to the power relay mechanism in response to detecting an unsafe state of the safety condition; and
- power converter circuitry coupled to the UPS input, the UPS output, and the relay mechanism output, the power converter circuitry configured to convert the AC input power to an output DC power, to convert the battery pack DC power to the output DC power, and to provide the output DC power to the UPS output;
  - wherein the power relay mechanism includes a motor actuator coupled to the control circuitry, the motor actuator being configured to automatically change the power relay mechanism from the open position to the closed position in response to the first control signal, and to automatically change the power relay mechanism from the closed position to the open position in response to the second control signal.

8. The UPS system of claim 7 wherein the at least one criterion further includes the power relay mechanism being in the open position.

9. The UPS system of claim 8 wherein the at least one criterion further includes a DC power at the power relay mechanism having a voltage at least as high as a threshold value.

10. A battery pack system comprising:
- a standard-sized information technology equipment rack;
- a power output;
- a plurality of batteries coupled together to provide a battery-pack DC power, the batteries being disposed in the equipment rack;
  - a power relay mechanism coupled to the power output and to the battery pack, the power relay mechanism selectively coupling the battery pack to the power output in a closed state and selectively isolating the battery pack from the power output in an open state, the power relay mechanism including a motor actuator to automatically change the power relay mechanism from the open state to the closed state and from the closed state to the open state; and
- control circuitry communicatively coupled to the power relay mechanism and configured to:
  - provide a first control signal automatically to the power relay mechanism in response to at least one of a main power associated with the battery pack system being unavailable or a voltage from the plurality of batteries being below a desired level, and
  - monitor a safety condition associated with the battery pack and provide a second control signal automatically to the power relay mechanism in response to detecting an unsafe state of the safety condition;
  - wherein, the power relay mechanism is configured to respond to the first control signal or the second control signal by changing from the closed state to the open state.

11. The battery pack system of claim 10 wherein the criteria further include the expiration of a timer.

12. A method for providing automated reconnection of a battery pack to power circuitry of an uninterruptible power supply (UPS), the method comprising:
- monitoring at least one criterion for selectively coupling a power output circuit of the UPS and a battery pack, the at least one criterion including an acceptability of a main power source coupled to an input of the UPS;
- monitoring a safety condition associated with the power output circuit;
- sending, based on the at least one criterion, a first control signal to a motor actuator in a power relay mechanism to couple the power output circuit and the battery pack;
- sending, based on detection of an unsafe state of the safety condition, a second control signal to the motor actuator to decouple the power output circuit of the UPS from the battery pack;
- in response to the first control signal, connecting the battery pack to the power output circuit using the motor actuator; and
- in response to the second control signal, decoupling the battery pack from the power output circuit using the motor actuator.

13. The method of claim 12 wherein monitoring the safety condition includes monitoring whether a door to a cabinet housing the battery pack is open.

14. The method of claim 12 wherein monitoring the at least one criterion includes monitoring a timer.

15. A non-transitory computer readable medium having stored thereon sequences of instruction including instructions that will cause a processor to:
- monitor at least one criterion for selectively coupling a power output circuit of an uninterruptible power supply (UPS) and a battery pack, the at least one criterion including acceptability of a main power source coupled to an input of the UPS;
- monitor a safety condition associated with the power output circuit;
- send, based on the at least one monitored criterion, a first control signal to a motor actuator in a power relay mechanism to cause the motor actuator to couple the power output circuit and the battery pack; and
- send, in response to an unsafe state of the safety condition, a second control signal to the motor actuator to cause the motor actuator to decouple the power output circuit from the battery pack.

16. The computer readable medium of claim 15 wherein the instructions to cause the processor to monitor the safety condition cause the processor to monitor whether a door to a cabinet housing the battery pack is closed.

17. The computer readable medium of claim 15 wherein the instructions to cause the processor to monitor cause the processor to monitor a timer.

18. A power relay mechanism to selectively couple a power output circuit of an uninterruptible power supply (UPS) and a battery pack, the power relay mechanism comprising:
- a switching circuit configured to selectively couple a battery pack to a power output circuit of the UPS and to selectively isolate the battery pack from the power output circuit; and
- a motor actuator coupled to the switching circuit and configured to:
    - automatically actuate the switching circuit to couple the battery pack to the power output circuit in response to at least one criterion including that a main power associated with the power output circuit changes from being unavailable to being available, and
    - automatically actuate the switching circuit to decouple the battery pack from the power output circuit in response to at least one unsafe condition associated with the power output circuit occurring.

19. The power relay mechanism of claim 18 further comprising a control circuit coupled to the motor actuator and configured to provide a first control signal to the motor actuator indicative of the at least one criterion and to provide a second control signal to the motor actuator indicative of the at least one unsafe condition.

20. The power relay mechanism of claim 19 wherein the control circuit is further configured to monitor the main power.

21. The power relay mechanism of claim 19 wherein the control circuit is further configured to monitor a timer and to provide the first or second control signal based in part on a status of the monitored timer.

* * * * *